United States Patent
Sobol

(10) Patent No.: US 7,034,848 B2
(45) Date of Patent: Apr. 25, 2006

(54) SYSTEM AND METHOD FOR AUTOMATICALLY CROPPING GRAPHICAL IMAGES

(75) Inventor: Robert E. Sobol, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 473 days.

(21) Appl. No.: 09/755,715

(22) Filed: Jan. 5, 2001

(65) Prior Publication Data

US 2002/0089516 A1    Jul. 11, 2002

(51) Int. Cl.
*G09G 5/00* (2006.01)

(52) U.S. Cl. ............... 345/620; 345/619; 382/118; 382/291; 382/292; 382/190

(58) Field of Classification Search ............ 382/118, 382/165, 190, 282, 291, 292; 345/419, 421, 345/620
See application file for complete search history.

(56) References Cited

U.S. PATENT DOCUMENTS

| | | | |
|---|---|---|---|
| 5,164,992 A | 11/1992 | Turk et al. ............ 382/2 |
| 5,781,665 A | 7/1998 | Cullen et al. ............ 382/254 |
| 5,892,854 A | 4/1999 | de Queiroz et al. |
| 5,978,519 A * | 11/1999 | Bollman et al. ............ 382/282 |
| 6,009,197 A * | 12/1999 | Riley ............ 382/199 |
| 6,072,538 A | 6/2000 | Keating ............ 348/625 |
| 6,128,397 A | 10/2000 | Baluja et al. ............ 382/118 |
| 6,144,755 A * | 11/2000 | Niyogi et al. ............ 382/118 |
| 6,297,846 B1 * | 10/2001 | Edanami ............ 348/239 |
| 6,650,366 B1 * | 11/2003 | Parulski et al. ............ 348/231.6 |

FOREIGN PATENT DOCUMENTS

| | | |
|---|---|---|
| EP | 0824246 A2 | 2/1998 |
| EP | 0939381 A2 | 9/1999 |
| EP | 1120742 A2 | 8/2001 |
| GB | 2370438 A | 6/2002 |
| WO | WO 99/09887 | 4/1999 |

* cited by examiner

Primary Examiner—Kimbinh T. Nguyen

(57) ABSTRACT

An image cropping system utilizes memory, an object detector, and an image cropper. A set of digital data that defines a graphical image is stored in the memory. The object detector analyzes the set of digital data and automatically identifies a portion of the digital data that defines an image of a particular object. The image cropper then uses the identified portion to determine a position of the object image within the graphical image. Based on the position of the object image within the graphical image, the image cropper automatically crops the digital data. In this regard, the position of the object image within the graphical image serves as a reference for determining which portions of the set of digital data should be cropped.

40 Claims, 6 Drawing Sheets

SYSTEM AND METHOD FOR AUTOMATICALLY CROPPING GRAPHICAL IMAGES

BACKGROUND OF THE INVENTION

1. Field of the Invention

The present invention generally relates to image processing techniques and, in particular, to a system and method for automatically cropping a graphical image based on object images included within the graphical image.

2. Related Art

Cropping techniques can sometimes be employed to improve the appearance of a picture or photograph. For example, a photographer may inadvertently take a picture of an object that is undesirably positioned within the picture. One or more sides of the picture may be cropped to make the object of interest appear to be better positioned within the picture.

In another example, a photographer may inadvertently take a picture of an object that the photographer would rather not have included in the picture. As an example, while a photographer is taking a picture of a scene that is of interest to the photographer, a person of no interest to the photographer may walk into or reside in the scene without the photographer being aware of the person's presence in the scene. Thus, the photographer may take a picture that inadvertently includes the person of no interest to the photographer. If the image of this person is located close to an edge of the picture, cropping techniques can be employed to remove the portion of the picture that includes the unwanted image of the person.

In another example, a photographer may take a picture of an object and focus his attention on the object rather than on the surroundings of the object. As a result, the photographer may be unaware of the extent that the object's surroundings are included in the picture. In such a situation, it may be desirable to crop the edges of the picture to remove some of the surroundings such that the image of the object has more prominence within the resulting picture. There are various other situations in which image cropping may be employed to improve the appearance of a picture.

Before employing image cropping techniques, a user typically analyzes the image to determine if it would be desirable to crop any portions of the image. Once the user selects a portion of the image that should be cropped, the user may then employ conventional image cropping techniques to improve the appearance of the picture.

With the introduction of digital cameras, the process of cropping images has generally been facilitated. In this regard, software enhancement programs have been developed that allow users to easily enhance digital images via image cropping and other image enhancement techniques. However, most of these programs require the user to expend time and effort in analyzing an image to determine how a picture can be enhanced. Thus, there exists a heretofore unaddressed need in the industry for simplifying image enhancement techniques such that users can obtain high quality images with less time and effort.

SUMMARY OF THE INVENTION

The present invention overcomes the inadequacies and deficiencies of the prior art as discussed hereinbefore. Generally, the present invention provides an image cropping system and method for automatically cropping graphical images based on object images within the graphical images. By employing the image cropping techniques of the present invention, the appearance of the graphical images can be easily enhanced.

In architecture, the image cropping system of the present invention utilizes memory, an object detector, and an image cropper. A set of digital data that defines a graphical image is stored in the memory. The object detector analyzes the set of digital data and automatically identifies a portion of the digital data that defines an image of a particular object. The image cropper then uses the identified portion to determine a position of the object image within the graphical image. Based on the position of the object image within the graphical image, the image cropper automatically crops the digital data. In this regard, the position of the object image within the graphical image serves as a reference for determining which portions of the set of digital data should be cropped.

The present invention can also be viewed as providing a method for automatically cropping graphical images. The method can be broadly conceptualized by the following steps: storing digital data that defines a graphical image; automatically searching the digital data for a portion that defines an image of a particular object; identifying the portion based on the searching step; determining, based on the identified portion, a position of the object image within the graphical image; and automatically cropping the digital data based on the position of the object image.

Other systems, methods, features and advantages of the present invention will become apparent to one skilled in the art upon examination of the following detailed description, when read in conjunction with the accompanying drawings. It is intended that all such systems, methods, features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

The present invention generally relates to a system and method for automatically cropping a graphical image in order to enhance an appearance of the graphical image.

Since the image cropping is automatic, relatively little training and/or effort is required for a user to produce more pleasing photographs.

Figure 1:
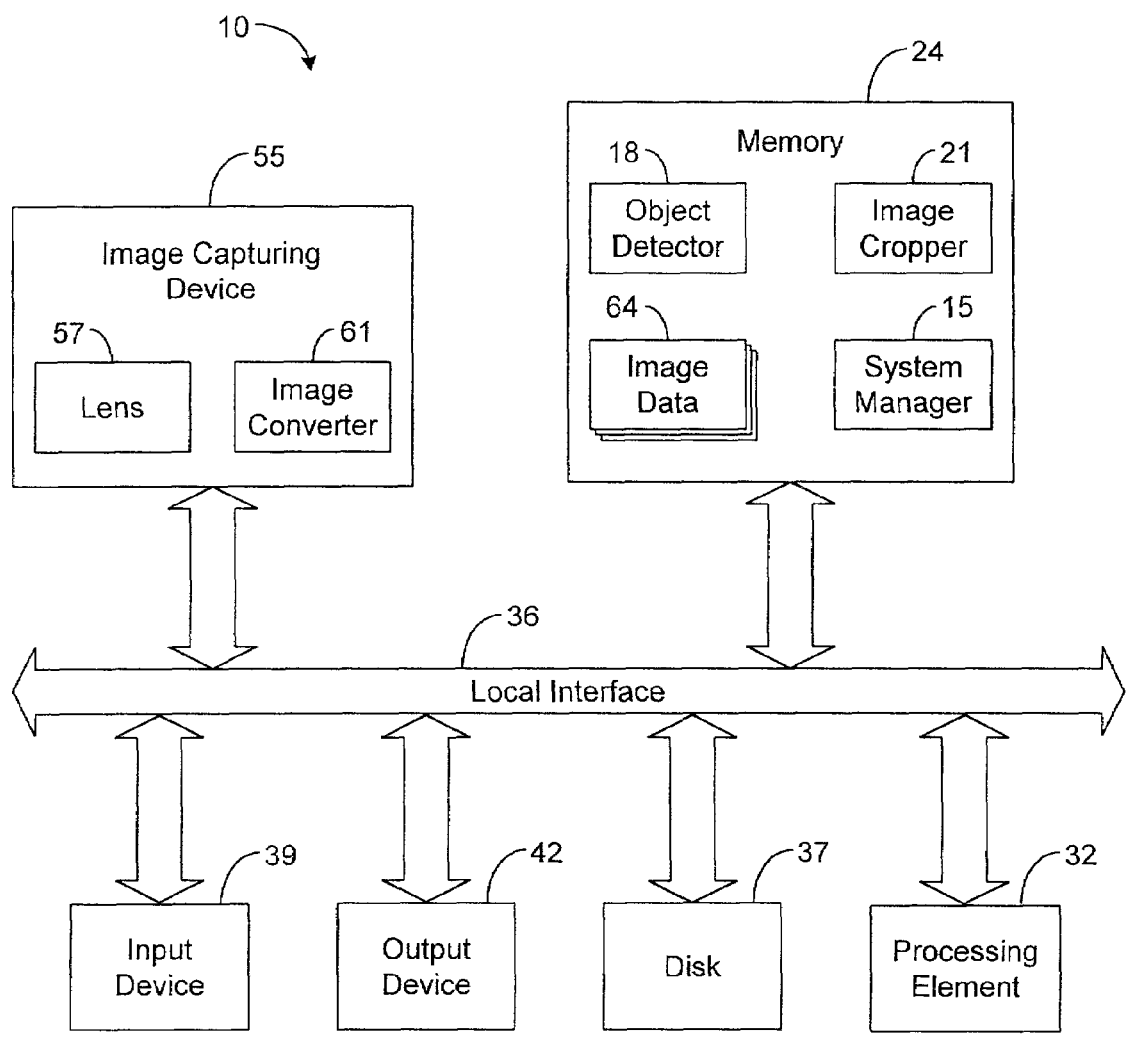
FIG. 1 is a block diagram illustrating an image cropping system in accordance with the present invention.

FIG. 1 depicts an image cropping system 10 in accordance with the present invention. As shown by FIG. 1, the system 10 preferably includes a system manager 15, an object detector 18, and an image cropper 21. The system manager 15, the object detector 18, and the image cropper 21 can be implemented in software, hardware, or a combination thereof. In the preferred embodiment, as illustrated by way of example in FIG. 1, the system manager 15, the object detector 18, and the image cropper 21 of the present invention along with their associated methodology are implemented in software and stored in memory 24 of the image cropping system 10.

Note that the system manager 15, the object detector 18, and/or the image cropper 21, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system manager 15, the object detector 18, and/or the image cropper 21 may be magnetically stored and transported on a conventional portable computer diskette.

The preferred embodiment of the image cropping system 10 of FIG. 1 comprises one or more conventional processing elements 32, such as a digital signal processor (DSP) or a central processing unit (CPU), that communicate to and drive the other elements within the system 10 via a local interface 36, which can include one or more buses. A disk storage mechanism 37 can be connected to the local interface 36 to transfer data to and from a nonvolatile disk (e.g., magnetic, optical, etc.). Furthermore, an input device 39 can be used to input data from a user of the system 10, and an output device 42 can be used to output data to the user. There are various devices that may be used to implement the input device 39 such as, but not limited to, a set (e.g, one or more) of switches, a set of buttons, a keypad, a key board, and/or a mouse. Furthermore, the output device 42 may be a liquid crystal display, a monitor, a printer, or any other conventional device for displaying an output.

In the preferred embodiment, the system 10 is implemented as a digital camera that is configured to take pictures via an image capturing device 55. In this regard, each component of FIG. 1 preferably resides within a portable housing, and the image capturing device 55 preferably includes a lens 57 for receiving and focusing light from a scene. The image capturing device 55 also includes a image converter 61 that is configured to convert the light into a set of digital data 64 that defines a digital image of the scene. This set of image data 64 may be transmitted to and stored within memory 24. As shown by FIG. 1, multiple sets of image data 64 respectively defining multiple pictures may be stored within memory 24.

In this regard, the input device 39 may include a button or other type of switch that, when activated, indicates that a picture should be taken. Upon activation of the button or other type of switch within input device 39, a set of image data 64 is transmitted to and stored within memory 24. This set of image data 64 defines an image exposed to the lens 57 approximately when the button or other type of switch was activated. The foregoing process may be repeated as desired. Each time the foregoing process is repeated, a new set of image data 64 defining an image exposed to the lens 57 is transmitted to and stored within memory 24. Note that it is possible to download one or more of the sets of image data 64 from an external device (not shown). For example, a disk may be interfaced with the system 10 via disk storage mechanism 37, and one or more sets of image data 64 may be downloaded into memory 24 from the disk.

It should be noted that it is not necessary for the system 10 to be implemented as a digital camera. For example, in another embodiment, the system 10 may be implemented as a desktop or laptop computer. In such an embodiment, the image capturing device 55 may be implemented as a detachable digital camera that acquires pictures as described above and that downloads the sets of image data 64 defining the pictures to memory 24. Alternatively, the image capturing device 55 may be implemented as a scanner that scans the surface of a document (e.g., a developed photograph) to define the sets of image data 64.

Other devices may be employed to implement the system 10. Indeed, any combination of devices that corresponds to the architecture of FIG. 1 for performing the functionality of the present invention, as described herein, may be employed to implement the system 10.

Once a set of image data 64 defining an image is stored in memory 24, the system manager 15 preferably invokes the object detector 18, which is configured to analyze the set of image data 64, as will be described in further detail hereafter. The system manager 15 may automatically invoke the object detector 18 when the system manager 15 detects the presence of the set of image data 64 within memory 24. Alternatively, a user may enter, via input device 39, an input indicating that the image defined by the set of image data 64 should be cropped. In response to the input entered by the user, the system manager 15 invokes the object detector 18 and instructs the object detector 18 to analyze the set of image data 64 defining the image that is to be cropped. As will be described in further detail hereafter, the image cropper 21 may utilize an object detected by the object detector 18 to automatically perform image cropping on the set of image data 64.

Note that the input entered by the user for invoking the object detector 18 may include data that indicates which image defined by the image data 64 should be cropped and, therefore, which set of image data 64 should be processed by the object detector 18 and image cropper 21. For example, the system manager 15 may be configured to transmit one or more sets of image data 64 to output device 42, which displays the images defined by the sets of image data 64 transmitted to the output device 42. These images may be displayed consecutively or simultaneously by the output device 42. The user may then select, via input device 39, the image to be cropped. In response, the system manager 15 instructs the object detector 18 to process the set of image data 64 defining the image selected by the user.

In the preferred embodiment, the object detector 18 analyzes the set of image data 64 to determine if any portions of the image data 64 define an image of a person's face. If a face is defined by a portion of the selected set of image data 64, the image cropper 21 may be invoked to crop the image defined by the set of image data 64 based on the pixel location of the detected face and/or the size of the detected face. Thus, the user is able to select which sets of image data 64 are analyzed and potentially cropped by the system 10. Note that other techniques may be employed for enabling the user to select which sets of image data 64 should be cropped and, therefore, processed by object detector 18 and image cropper 21.

In analyzing a set of image data 64, the object detector 18 is configured to detect any portions of the image data 64 that defines a face of a person. If a face is detected, the system manager 15 invokes the image cropper 21, and the object detector 18 informs the image cropper 21 of each face that is detected by the object detector 18. More specifically, the object detector 18 communicates to the image cropper 21 data that identifies the facial data within the set of image data 64. As will be discussed in further detail hereinbelow, the image cropper 21 analyzes the set of image data 64 based on the information communicated by the object detector 18 to determine whether any of the faces detected by the object detector 18 can be used as a reference for cropping the set of image data 64.

For example, in one embodiment, the image cropper 21 may determine whether any of the faces detected by the object detector 18 are located close to or within the center region of the digital image or picture defined by the image data 64. If the image cropper 21 detects such a face, then it can be assumed that the photographer's intent in capturing the image data 64 was to take a picture of the person whose facial image is located close to or within the center region. Thus, the image cropper 21 may utilize the information from the object detector 18 to automatically crop the image data 64. As an example, the image cropper 21 may crop the set of image data 64 to better position the detected face within the image defined by the set of image data 64.

In this regard, when a photographer takes a picture of a person, the image of the person sometimes appears slightly off center or otherwise undesirably positioned. The image cropper 21 may be configured to crop one or more edges of the image defined by the image data 64 in order to better position the person within the image. For example, the detected face may be off center (e.g., closer to one of the side edges of the image), and the image cropper 21 may crop the side edge furthest from the face in order to better center the face within the two side edges. In this example, the image cropper 21 utilizes the detected face as a reference to indicate the approximate position of the person within the picture so that the image data 64 defining the picture can be appropriately cropped to substantially center the image of the person between the side edges of the picture.

Figure 2:
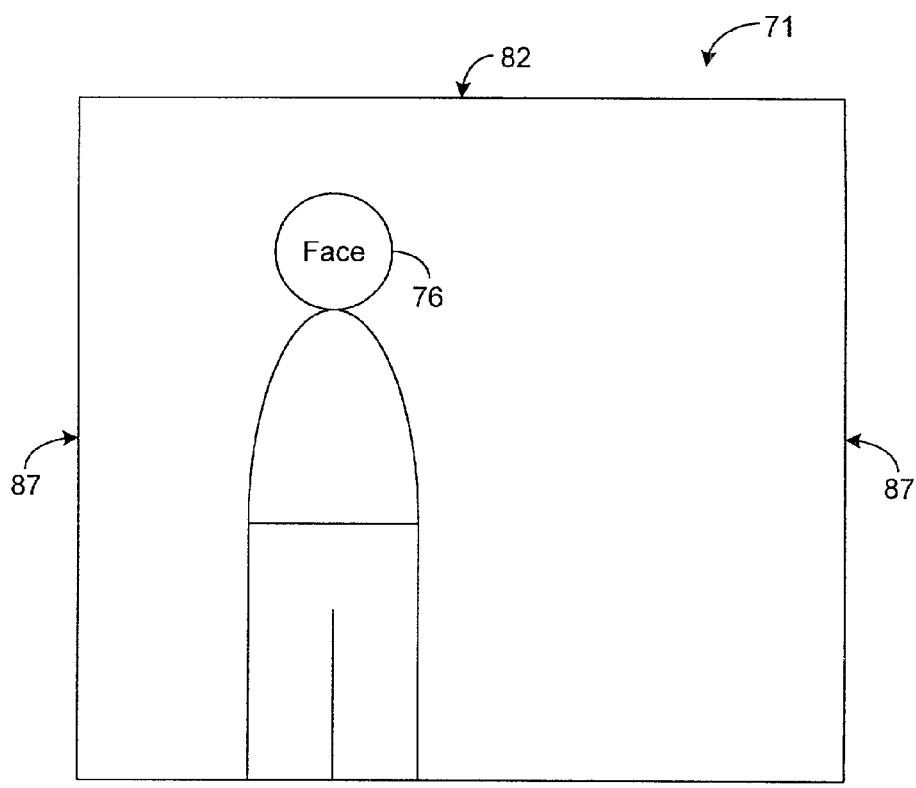
FIG. 2 is a block diagram illustrating a picture that displays a relatively small facial image therein.
Figure 3:
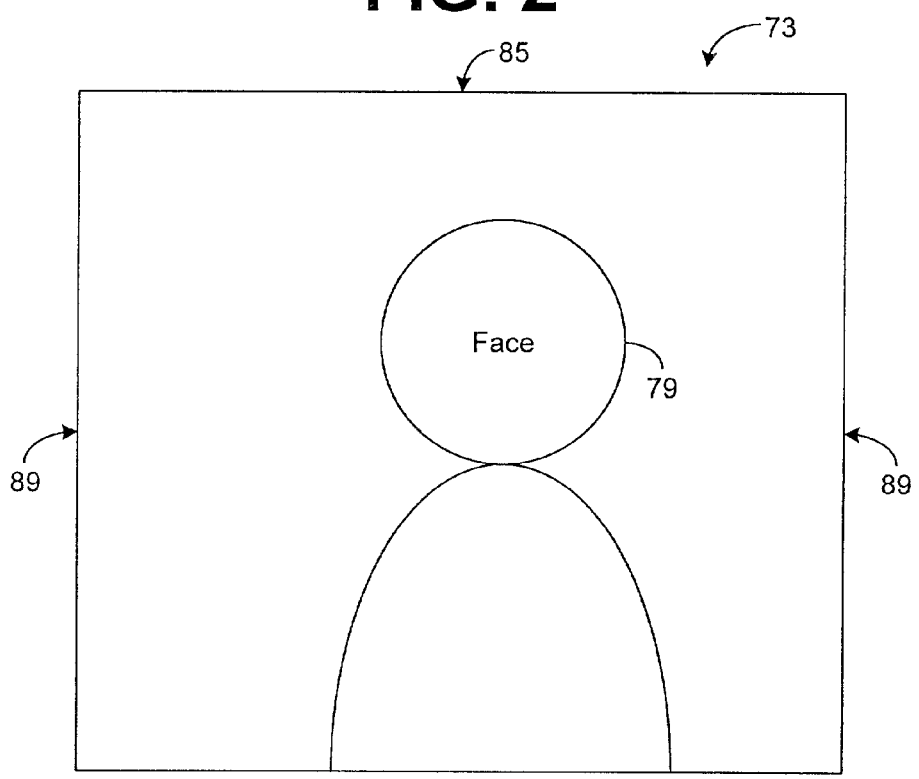
FIG. 3 is a block diagram illustrating a picture that displays a relatively large facial image therein.

In another example, the image cropper 21 may crop the image based on the size of the face within the image. In this regard, a smaller face normally indicates that the person appears farther away in the image. For example, refer to FIGS. 2 and 3, which respectively depict two different pictures 71 and 73 of a person. FIG. 2 depicts a picture 71 that includes a small facial image 76, and FIG. 3 depicts a picture 73 that includes a large facial image 79. As a result, it is likely that the intent of the photographer in taking picture 71 is to capture a panned out view of the person, and it is likely that the intent of the photographer in taking picture 73 is to capture more of a close up view of the person. Thus, it may be desirable to crop the pictures 71 and 73 differently based on the size of the facial images 76 and 79.

Figure 4:
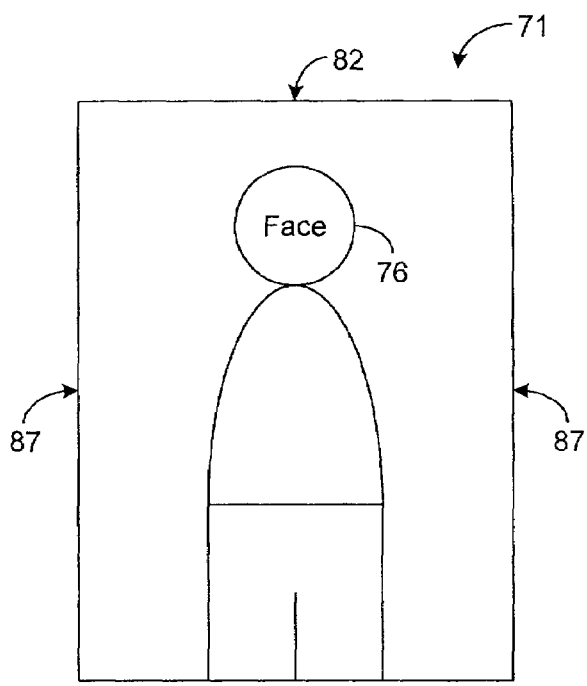
FIG. 4 is a block diagram illustrating the picture of FIG. 2 once the picture has been cropped via techniques in accordance with the present invention.
Figure 5:
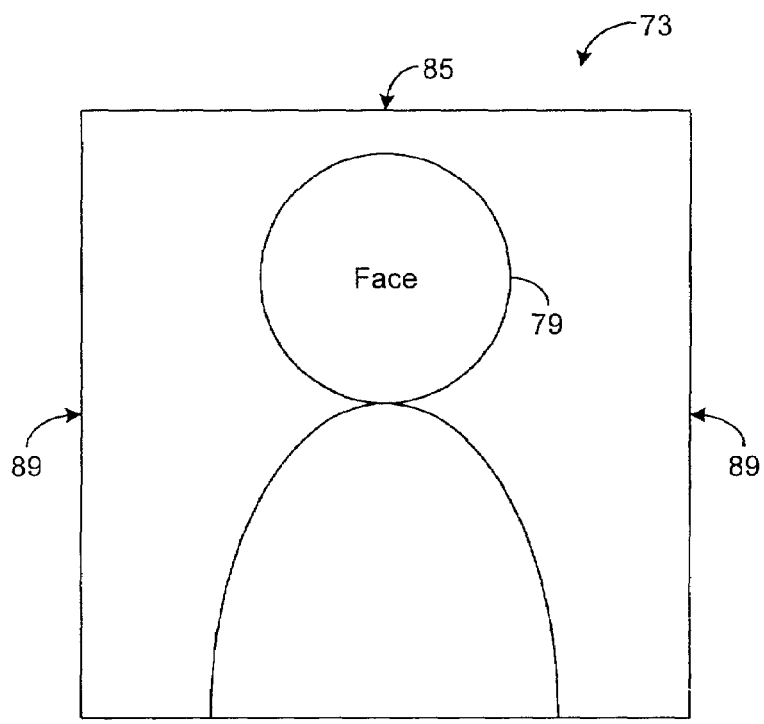
FIG. 5 is a block diagram illustrating the picture of FIG. 3 once the picture has been cropped via techniques in accordance with the present invention.

More specifically, as shown by FIGS. 4 and 5, it may be desirable to crop the top edge 82 of picture 71 such that the facial image 76 appears lower in the picture 71 (e.g., further away from the top edge 82) relative to picture 73, and it may be desirable to crop the top edge 85 of picture 73 such that the facial image 79 appears higher in the picture, 73 (e.g., closer to top edge 85) relative to picture 71. Further, the image cropper 21 may crop one or more of the side edges 87 of picture 71 to substantially center the facial image 76 between side edges 87, and the image cropper 21 may crop one or more of the side edges 89 of picture 73 to substantially center the facial image 79 between side edges 89.

Moreover, the image cropper 21 may be configured to crop images to automatically position facial images within a first size range higher in the images, as shown by FIG. 4, and to crop images to position facial images within a second larger size range lower in the image, as shown by FIG. 5. Therefore, the position of the facial image within the cropped image is based on the size of the facial image, and the size of the facial image can be automatically determined. Thus, the aforementioned cropping based on the size of facial image may be automatic. It should be noted that there are other algorithms that may be employed to crop the image data 64 automatically based on the pixel location of a detected face and/or the size of the detected face. The examples provided herein are for illustrative purposes, and the scope of the invention should not be limited to these examples.

Note that there are a variety of situations that increase the likelihood that an image of person will not be optimally positioned within an image defined by the image data 64. For example, in taking a picture of a person for a driver's license or other types of identification cards, great care to appropriately position the person before capturing his image is sometimes not taken. As a result, the image of the person within the driver's license picture is likely to be off center or otherwise undesirably positioned. By employing the image cropping techniques described above, the image of the person can be appropriately and automatically positioned within the picture. Thus, better pictures are produced, and the efficiency of the picture taking process can be increased since less care should be required in positioning the person in front of the image capturing device 55.

In another example, the image cropper 21 may crop the image data 64 simply for the purpose of bringing the edges of the picture closer to the image of the person located at the approximate center of the picture. As indicated in the Background of the Invention section, a photographer may focus his attention on the object at the approximate center of the picture. As a result, the photographer may fail to notice the extent of the surrounding scene that is also included in the picture. This may result in the photographer capturing a greater portion of the surrounding scene than what is actually desired by the photographer. By cropping the image data 64 to bring the edges of the picture closer to the image of the person located close to or within the center region of the picture, some of the surrounding scene can be eliminated. Such cropping may cause a viewer of the picture to focus more on the image of the person at the center of the picture than on the image of the scene around the person. The foregoing cropping may also cause the image to appear to be more magnified such that the picture appears to have been captured by a camera with a higher zoom ratio.

In the foregoing example, the image cropper 21 may utilize the position of the facial image within the picture close to or within the center region of the picture in order to ensure that image of person is located at a desirable position within the picture, as described above, and/or to determine the extent of cropping that is desired. In this regard, it may be desirable to configure the image cropper 21 to increase the amount of cropping as the size of the facial image decreases. For example, it may be desirable to crop picture 71 of FIG. 2 more than picture 73 of FIG. 3, since the picture 73 is more of a close up picture than picture 76.

The image cropper 21 may also be configured to remove objects close to the edge of the image defined by the image data 64. Often, the presence of such objects in a scene being photographed is not noticed by the photographer when taking a picture since the photographer may be focusing his attention on the object located close to or within the center region of the picture. In the foregoing example, the image cropper 21 again utilizes the detected face of the person at the approximate center of the picture as a reference for indicating the person's position within the picture so that the image of the person remains appropriately centered in the cropped picture and/or is better positioned within the cropped picture.

In another embodiment, the image cropper 21 may crop the image data 64 based on a face that is not located close to or within the center region of the picture. For example, the image cropper 21 may be configured to crop an edge of the picture in order to remove an image of a person located close to the edge of the picture. In this regard, as set forth in the Background of the Invention Section, a person sometimes wanders into a scene that is being photographed without the photographer being aware that the person is within the photographed scene. If the object detector 18 detects a face close to an edge of the picture, then it can be assumed that the detected face was not intended to have been included in the scene being photographed. Thus, the image cropper 21 may be configured to crop a portion of the image data 64 that defines at least the detected face to thereby remove the image of the person appearing close to the edge of the picture. In other words, the image cropper 21 utilizes the detected face as a reference for indicating which portions of the image data 64 should be cropped.

As described in the above embodiments, the image cropper 21 may utilize a detected face as a reference for automatically cropping the image data 64. Thus, automatic detection of faces defined by the image data 64 may be an important feature of the present invention in many applications. Accordingly, the architecture and functionality of an exemplary embodiment of the object detector 18 will now be described in more detail.

As previously set forth, the object detector 18 analyzes a set of image data 64 that defines a digital image and, based on the image data 64, detects which portions of the digital image contains a face. If the digital image contains a number of faces, the object detector 18 detects and locates the data defining each of the faces. The object detector 18 employs a face detection technology to detect facial images within the image data 64. In one embodiment, the face detection technology used by the object detector 18 for face detection is the neural network-based face detection technology. The neural network-based face detection technology is disclosed in a publication entitled "Human Face Detection in Visual Scenes," by H. Rowley, S. Baluja, and T. Kanade in November 1995. The publication is available from Carnegie Mellon University's Internet set at www.ius.cs.cms.edu/IUS/har2/www/CMU-CS-95-158R/. H. Rowley and S. Baluja further describe their face detection techniques in U.S. Pat. No. 6,128,397, which is incorporated herein by reference. In another embodiment, the face detection technology used by the object detector 18 for face detection is the principle component analysis-based face detection technology. This principle component analysis-based face detection technology is disclosed in U.S. Pat. No. 5,164,992, dated Nov. 17, 1992, and entitled "Face Recognition System," which is incorporated herein by reference. Alternatively, other known face detection technologies may be used by the object detector 18.

Figure 6:
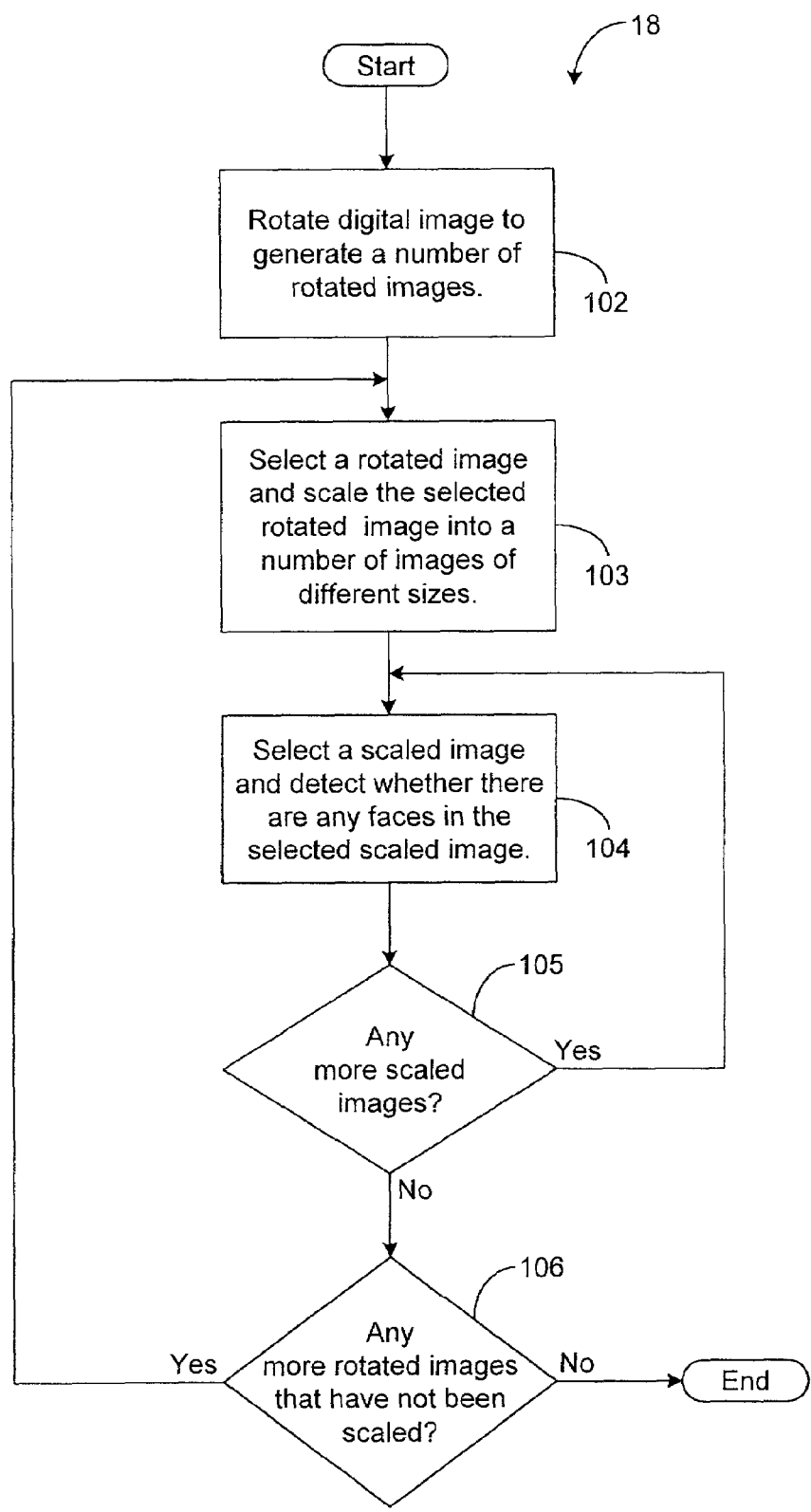
FIGS. 6 and 7 depict a flow chart that illustrates the architecture and functionality of an object detector depicted in FIG. 1.
Figure 7:
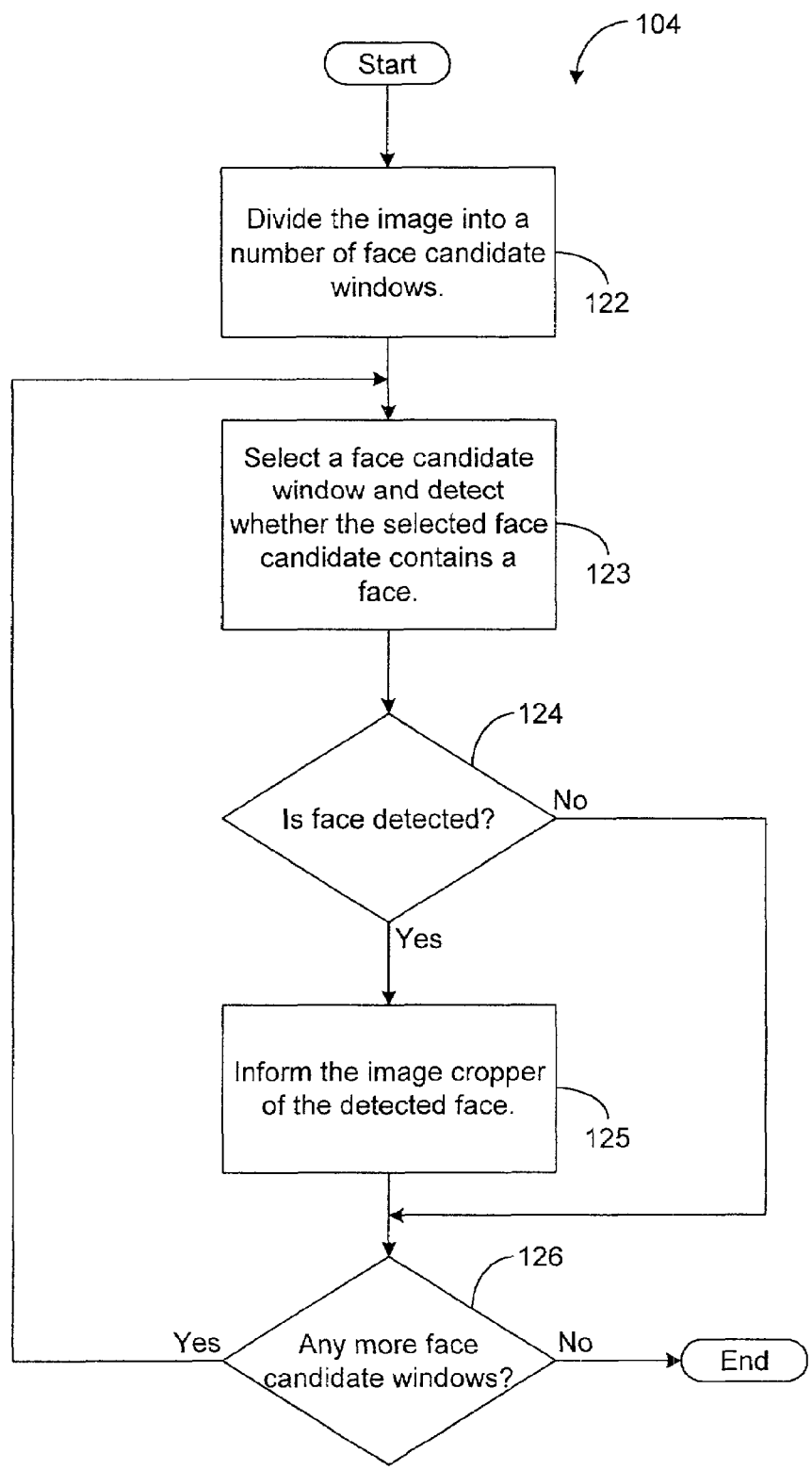

When the object detector 18 employs the neural network-based face detection technology, the object detector 18 detects if the digital image contains a face by dividing the digital image into a number of face candidate windows (not shown) and then detecting if each face candidate window contains a face by applying a set of neural network-based filters (also not shown) to each of the face candidate windows within the digital image. This is described in more detail in the above mentioned publication entitled "Human Face Detection in Visual Scenes." In this case, the face candidate windows can be non-overlapping or overlapping. The filters examine each face candidate window in the digital image at several scales, looking for locations that might contain a face (e.g., looking for eye locations). The object detector 18 then uses an arbitrator to combine the filter outputs. The arbitrator is used to merge detections from individual filters and eliminate overlapping detections. As a result, the object detector 18 detects faces. Using the neural network-based face detection technology for the object detector 18 makes the face detection robust, relatively fast, and successful in detecting most faces. In addition, it allows the object detector 18 to detect different kinds of faces with different poses and lightings. FIGS. 6 and 7 depict the architecture and functionality of the object detector 18 in an embodiment where the object detector 18 employs the neural network-based face detection technology.

As shown by block 102 of FIG. 6, the object detector 18 rotates the digital image defined by the image data 64 to generate a number of rotated images of the digital image. The purpose of rotating the digital image is to allow detection of faces at various orientations in the digital image. The number of rotated images is not critical to the present invention and may vary as desired.

At block 103, the object detector 18 selects one of the rotated images of the digital image and scales the selected image into a number of images of different sizes. At block 104, the object detector 18 selects one scaled image and then detects whether any faces are within the scaled image. At block 105, the object detector 21 determines if there are any more scaled images that have not been selected in block 103. If there are any such scaled images, block 104 is repeated. If there are no such scaled images, then block 106 is performed to determine if there are any more rotated images that have not been scaled for face detection. If the answer is yes, then the object detector 18 returns to block 103. If the answer is no, then the object detector 18 terminates processing of the image data 64 that is being analyzed.

Referring to FIG. 7, the object detector 18, to perform block 104, first divides the selected scaled image into a number of face candidate windows, as shown by block 122. As described above, the face candidate windows can be overlapping or non-overlapping. At block 123, the object detector 18 detects if a face candidate window contains a face. If it is determined that a face is detected at block 124, then block 125 is performed. In block 125, the object detector 18 communicates to the image cropper 21 data that identifies the portion of image data 64 defining the detected face. If, at block 124, it is determined that the face candidate window does not contain a face, then block 125 is skipped. If there are more undetected face candidate windows at block 126, the object detector 18 returns to block 123. Otherwise, the object detector 18 proceeds to block 105 of FIG. 6.

It should be noted that the image cropper 21 may be configured to automatically crop each set of image data 64 that is stored in memory 24 and that defines a face capable of being used as a reference for cropping. Therefore, the cropping performed by the image cropper 21 may be transparent to the user.

Alternatively, the user of the system 10 may be allowed to control which kinds of cropping techniques are enabled. For example, a list of options, such as an option for centering an image of person, an option for removing the images of persons appearing close to an image edge, etc., may be displayed to the user via output device 42 (FIG. 1). The user may then select, via input device 39, which of the options the user wishes to have enabled. For example, the user may select the option for repositioning an image of a person to thereby enable this option. Based on the user's selection, the image cropper 21 may be configured to determine whether an image or a picture defined by a set of image data 64 contains an image of a person's face close to or within the center region of the picture. When the picture contains such a facial image, the image cropper 21 may be configured to crop the image data 64 in an attempt to appropriately position the image of the person within the picture according to techniques previously described herein. Without an input indicating that the user would like the repositioning of images to occur, the image cropper 21 may be configured to refrain from performing the foregoing functionality. Thus, the user may control the types of image cropping that are enabled or disabled, but the detection of facial data and the cropping performed based on the detected facial data is automatic, when such cropping is enabled.

Figure 8:
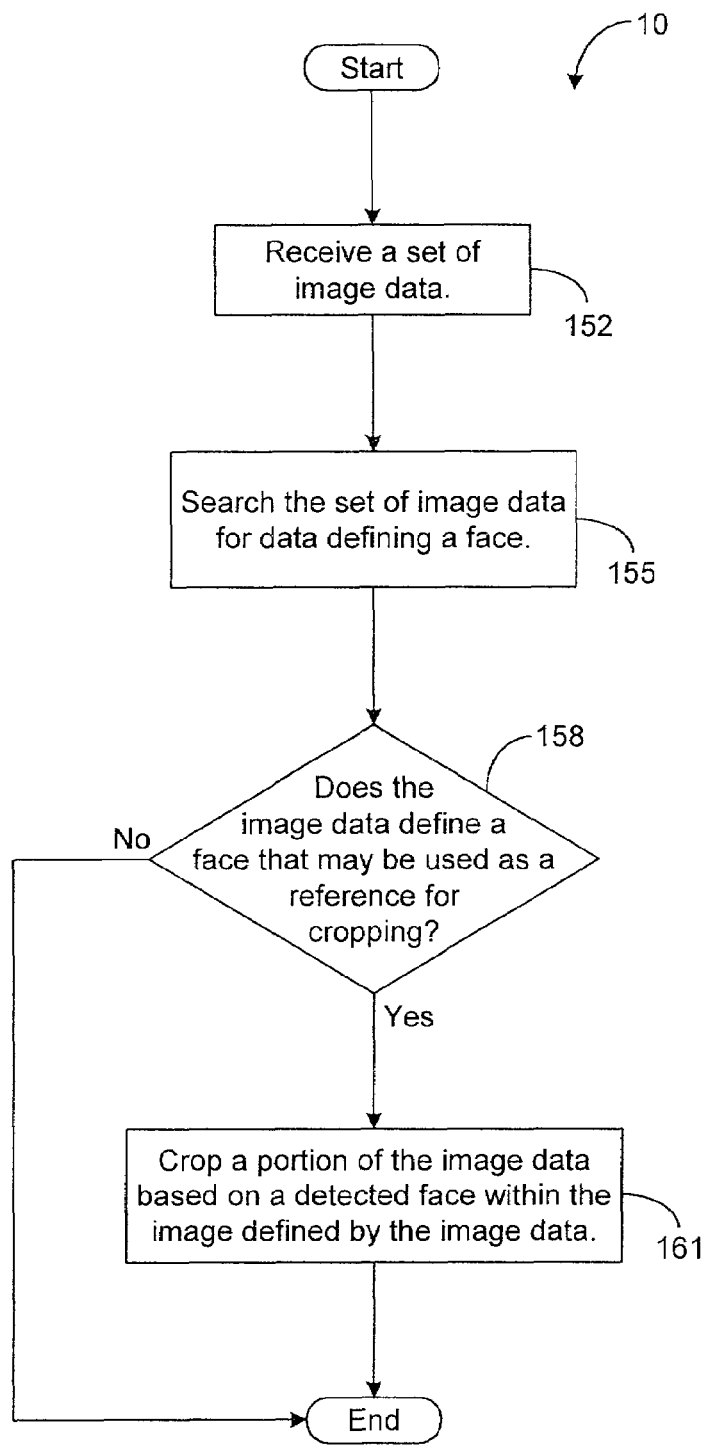
FIG. 8 depicts a flow chart that illustrates the architecture and functionality of the image cropping system depicted in FIG. 1.

The preferred use and operation of the image cropping system 10 and associated methodology are described hereafter with reference to FIG. 8. For illustrative purposes, assume that the image cropping system 10 is configured to automatically crop a set of image data 64 defining an image of a scene in order to remove images of persons located close to the edges of the scene. However, it should be noted that it is possible for the system 10 to be configured to crop according to other methodologies for achieving other results.

In block 152, a set of image data 64 that defines a picture is stored into memory 24. The set of image data 64 may be the data produced by the image capturing device 55 in capturing an image of a scene. After the set of image data 64 is received in block 152, the object detector 18 analyzes the set of image data 64 to detect which portions of the image data 64 define an image of a person's face, as shown by block 155. During block 155, the object detector 18 informs the image cropper 21 of any facial data (i.e., data within image data 64 that defines a person's face) detected by the object detector 18. Based on the set of image data 64 being analyzed and the information provided from the object detector 18, the image cropper 21 determines in block 158 whether the any of the detected faces may be used as a reference for cropping.

In the present example, the image cropper 21 in block 158 determines whether any of the detected faces are located close to an edge of the picture defined by the set of image data 64 being analyzed. If there are any such detected faces, then the image cropper 21 crops the image data 64 in block 161. More specifically, in the present example, the image cropper 21 crops the image data 64 such that the picture defined by the image data does not include an image of any person whose face was determined in block 158 to be close to an edge of the picture. This may be accomplished by cropping the edges of the picture such that at least the portions of the picture that include the detected face are removed. In other words, the image cropper 21 crops at least a portion of the image data 64 that defines a face located close to an edge of the image defined by the image data 64. By performing the foregoing techniques, the images of persons close to the edges of a picture may be automatically cropped and, therefore, removed from the picture.

For purposes of illustration, the present invention has been described herein as utilizing a detected face as a reference for the image cropper 21 in performing automatic cropping. However, it should be noted that images of other types of objects capable of automatic detection may be similarly used as a reference for the cropping performed by image cropper 21. As an example, another type of object detected close to the center of a picture defined by a set of image data 64 may be used as a reference for cropping the image data 64 in an effort to reposition the object within the picture. Alternatively, the image of another type of object that appears close to an edge of the picture may be cropped by the image cropper 21. Indeed, the type of object that is automatically detected in order to provide the image cropper 21 with a reference for performing cropping according to the techniques described herein is not critical to the configuration and operation of the system 10.

In addition, some example situations in which cropping is desirable have been described herein. Some of these example situations include cropping a scene to reposition an object within the scene, cropping a scene to remove the image of a particular object from the scene, etc. It should be apparent to one skilled in the art upon reading this disclosure that there may be other situations in which automatic cropping according to the principles of the present invention is desirable.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, at least the following is claimed:

1. A system for automatically cropping graphical images, comprising:
   memory for storing digital data that defines a graphical image captured by said system;
   an object detector configured to perform a search of said digital data for an object of a particular type; and
   an image cropper configured to automatically identify, based on said search, at least one object of said particular type within said graphical image as an object of interest based on a position of said at least one object within said graphical image but not based on any other graphical image captured by said system, said image cropper further configured to automatically perform a cropping operation on said graphical image such that said at least one object identified as an object of interest is moved closer to a center of said graphical image.

2. The system of claim 1, wherein said at least one object is an image of a person's face, and wherein said object detector is configured to search said digital data for facial images.

3. The system of claim 1, wherein said cropping operation is based on a size of said at least one object.

4. The system of claim 1, wherein said cropping operation is performed such that said at least one object is substantially centered between two edges of said graphical image.

5. The system of claim 1, further comprising:
an input device for receiving an input from a user; and
a system manager configured to enable said image cropper based on said user input.

6. The system of claim 1, further comprising an image capturing device configured to receive an image of a scene and to produce said digital data based on said image received by said image capturing device.

7. The system of claim 6, wherein said image capturing device includes a lens for receiving said image of said scene and an image converter for producing said digital data based on said image of said scene.

8. The system of claim 1, wherein said image cropper is configured to identify said at least one object as an object of interest based on whether said at least one object is located close to a center of said graphical image.

9. A system for automatically cropping graphical images, comprising:
memory for storing digital data that defines a graphical image;
an object detector configured to analyze said digital data and to automatically identify a graphical object within said graphical image; and
an image cropper configured to make a determination as to whether said a graphical object is close to an edge of said graphical image and to automatically identify, based on said determination, said graphical object as an object to be removed from said graphical image and to automatically crop said digital data based on said determination such that said graphical object is removed from said graphical image.

10. The system of claim 9, wherein said graphical object is an image of a face.

11. A system for automatically cropping graphical images, comprising:
means for capturing graphical images;
memory for storing digital data that defines a graphical image captured by said capturing means;
means searching said digital data for an object of a particular type; and
means for automatically cropping said graphical image, said cropping means configured to automatically identify, based on said searching means, at least one object of said particular type within said graphical image as an object of interest based on a position of said at least one object image within said graphical image but not based on any other graphical image captured by said capturing means, said cropping means configured to crop said graphical image such that said at least one object identified as an object of interest is moved closer to a center of said graphical image.

12. The system of claim 11, wherein said at least one object is an image of a person's face, and wherein said searching means is configured to search said digital data for facial images.

13. The system of claim 11, wherein said cropping means crops said graphical image based on a size of said at least one object.

14. The system of claim 11, wherein said cropping crops said graphical image such that said at least one object is substantially centered between two edges of said graphical image.

15. The system of claim 11, further comprising:
means for receiving an input from a user; and
means for enabling said cropping means based on said user input.

16. The system of claim 11, further comprising a means for receiving an image of a scene and for producing said digital data based on said image received by said receiving means.

17. A method for automatically cropping graphical images, comprising:
capturing a graphical image;
storing digital data that defines said graphical image;
automatically searching said digital data for an object of a particular type;
automatically identifying, based on said searching, at least one object of said particular type as an object of interest based on a position of said at least one object within said graphical image but not based on any other captured image other than said graphical image; and
automatically cropping said graphical image based on said identifying such that said at least one object identified as an object of interest is substantially centered between at least two edges of said graphical image.

18. The method of claim 17, wherein said at least one object comprises an image of a person's face.

19. The method of claim 17, wherein said cropping is further based on a size of said at least one object.

20. The method of claim 17, wherein said searching and cropping are automatically performed in response to said storing.

21. The method of claim 17, further comprising:
receiving an input from a user; and
enabling said cropping based on said user input.

22. The method of claim 17, further comprising enabling a user to select the type of automatic cropping to be performed in said cropping.

23. The method of claim 17, further comprising making a determination as to whether said at least one object is a facial image, wherein said cropping is based on said determination.

24. The method of claim 17, further comprising determining an extent that said at least one object is from a center region of said graphical image, wherein said identifying is based on said determining.

25. A system for automatically cropping graphical images, comprising:
an image capturing device configured to capture graphical images;
memory for storing digital data that defines a graphical image captured by said image capturing device;
an object detector configured to automatically detect a face within said graphical image; and an image cropper configured to make a determination as to whether said face is within a particular region of said graphical image and to automatically identify said face as an object of interest based on said determination if said face is within said particular region, said image cropper further configured to automatically perform a cropping operation on said graphical image such that said face is moved closer to a center of said graphical image if said face is determined to be an object of interest, wherein said cropping operation is not based on any image captured by said image capturing device other than said graphical image.

26. The system of claim 25, wherein said object detector is further configured to detect a second face in said graphical image, and wherein said image cropper is configured to perform said cropping operation such that said second face is removed from said graphical image.

27. A method for automatically cropping graphical images, comprising:
storing digital data that defines a graphical image;
detecting a plurality of faces within said graphical image;
determining an extent that at least one of said faces is from a center region of said graphical image;
automatically identifying, based on said determining, said at least one face as an object of interest if said at least one face is within or close to said center region; and
automatically cropping said graphical image based on said identifying such that said at least one face is substantially centered within said graphical image.

28. The method of claim 27, wherein said cropping comprises removing, from said graphical image, at least one of said faces that is not identified as an object of interest.

29. A method for cropping a graphical image, comprising:
detecting a plurality of faces in the graphical image;
determining if at least one of the faces is close to a center of the graphical image;
automatically selecting one of the faces to remain in the graphical image and one of the faces for removal from the graphical image based on the determining; and
automatically cropping the graphical image based on said selecting such that the face selected for removal is removed from the graphical image.

30. The method of claim 29, further comprising determining a location in the graphical image of each of the plurality of faces.

31. The method of claim 29, wherein the cropping the graphical image comprises positioning one of the plurality of faces closer to the center.

32. The method of claim 29, wherein the cropping is performed such that said face selected to remain in the graphical image is moved closer to the center.

33. A method for cropping a graphical image, comprising:
detecting a face in a digital image of a picture; and
automatically cropping the digital image based on a size of the face relative to the digital image,
wherein the automatically cropping further comprises moving the face away from a center of the picture.

34. A system for automatically cropping graphical images, comprising:
memory for storing digital data that defines a graphical image;
an object detector configured to detect a plurality of objects of a particular type within said graphical image; and
an image cropper configured to make a determination as to whether at least one of said objects is close to a center of said graphical image and to automatically identify, based on said determination, said at least one object as an object of interest if said at least object is located close to said center, said image cropper further configured to crop said graphical image such that said at least one object is substantially centered within said graphical image.

35. The system of claim 34, wherein said objects of a particular type are facial images, and wherein said object detector is configured to search said graphical image for facial images to detect said objects of said particular type.

36. The system of claim 34, wherein said image cropper is configured to automatically remove at least one of said detected objects that is not identified as an object of interest by said image cropper.

37. A method for automatically cropping graphical images, comprising:
detecting an object within said graphical image;
determining whether said object is close to an edge of said graphical image;
selecting said object for removal from said graphical image based on said determining if said determining indicates that said object is close to said edge; and
automatically removing said object from said graphical image based on said selecting.

38. The method of claim 37, wherein said object is a face and said method further comprises searching said graphical image for facial images.

39. The method of claim 37, further comprising displaying said graphical image after said removing.

40. A method for cropping a graphical image, comprising:
detecting a face in a digital image of a picture; and
automatically cropping the digital image based on a position of the face within the digital image,
wherein the automatically cropping further comprises moving the face away from a center of the picture.

* * * * *

UNITED STATES PATENT AND TRADEMARK OFFICE
CERTIFICATE OF CORRECTION

| | | |
|---|---|---|
| PATENT NO. | : 7,034,848 B2 | Page 1 of 1 |
| APPLICATION NO. | : 09/755715 | |
| DATED | : April 25, 2006 | |
| INVENTOR(S) | : Robert E. Sobol | |

It is certified that error appears in the above-identified patent and that said Letters Patent is hereby corrected as shown below:

In column 11, line 43, in Claim 9, after "said" delete "a".

Signed and Sealed this

Twelfth Day of May, 2009

JOHN DOLL
*Acting Director of the United States Patent and Trademark Office*